Patented Apr. 1, 1924.

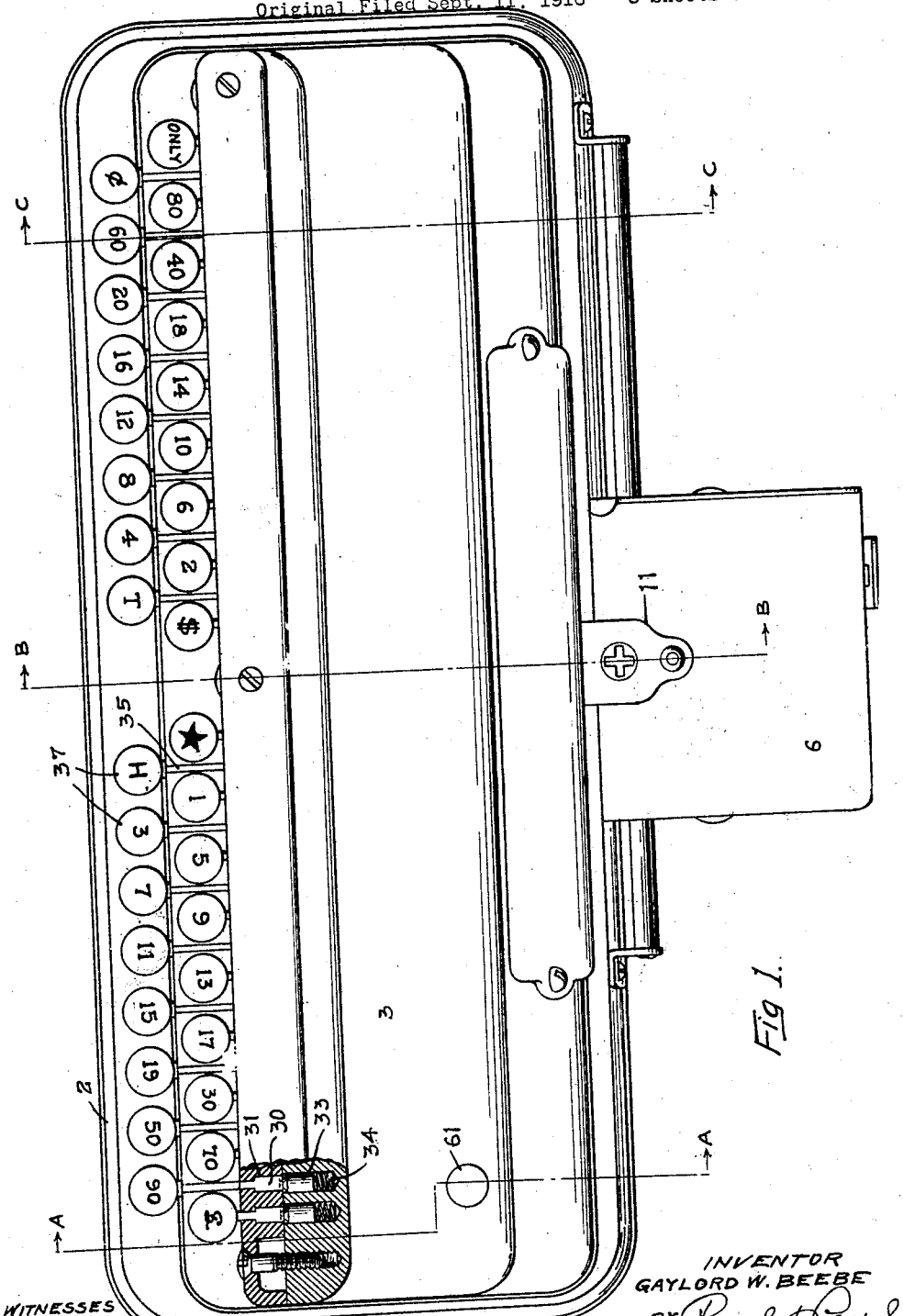

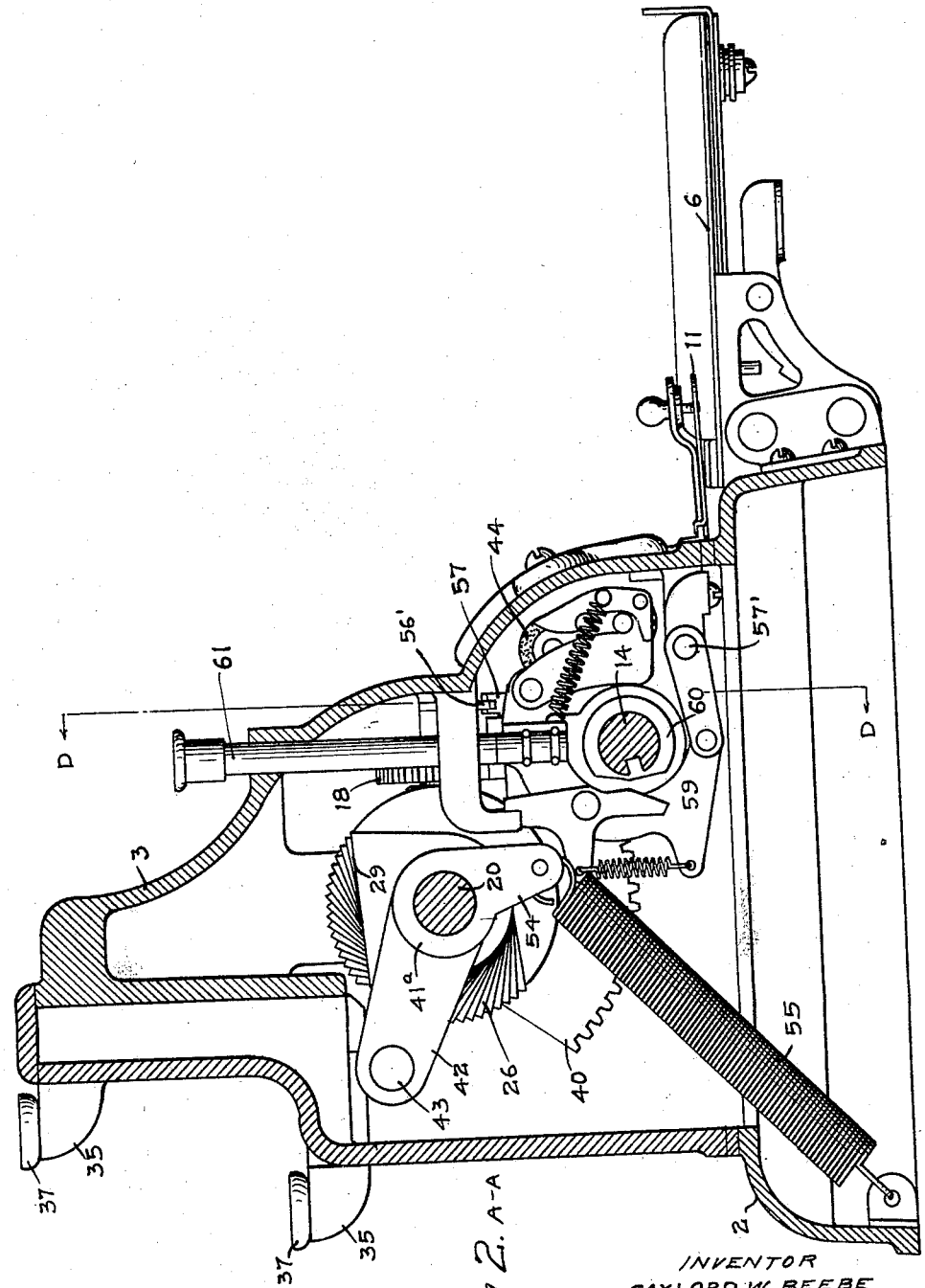

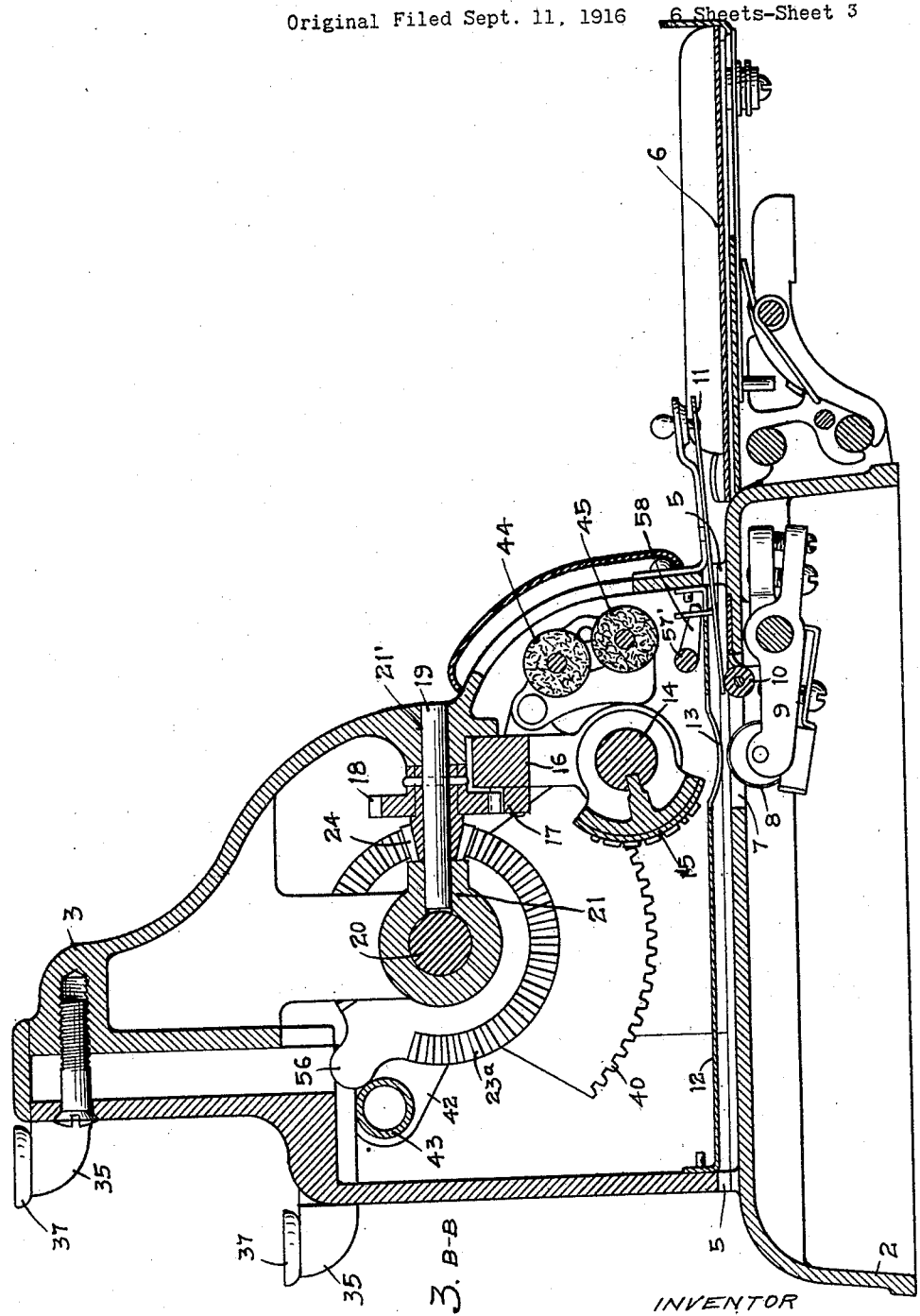

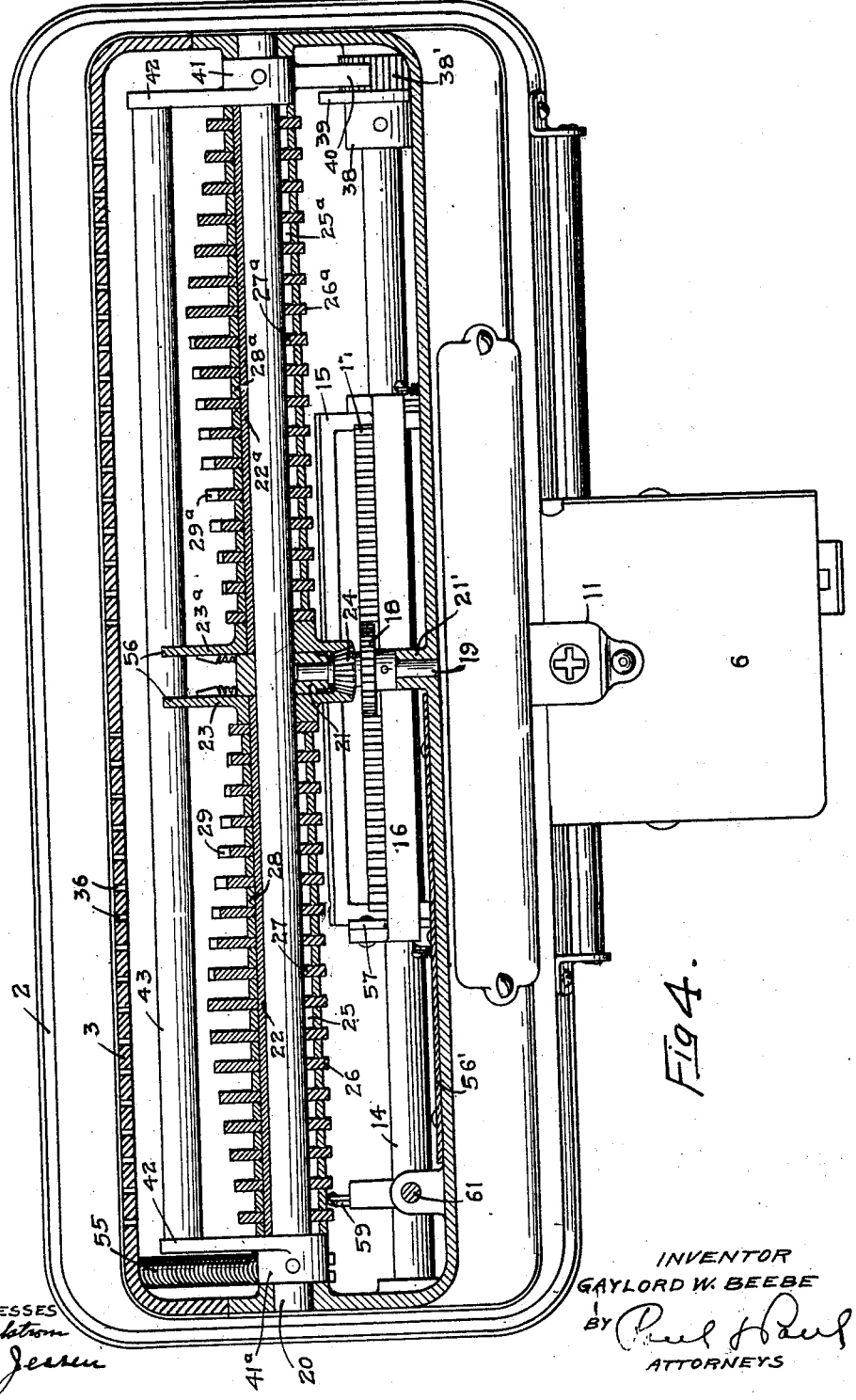

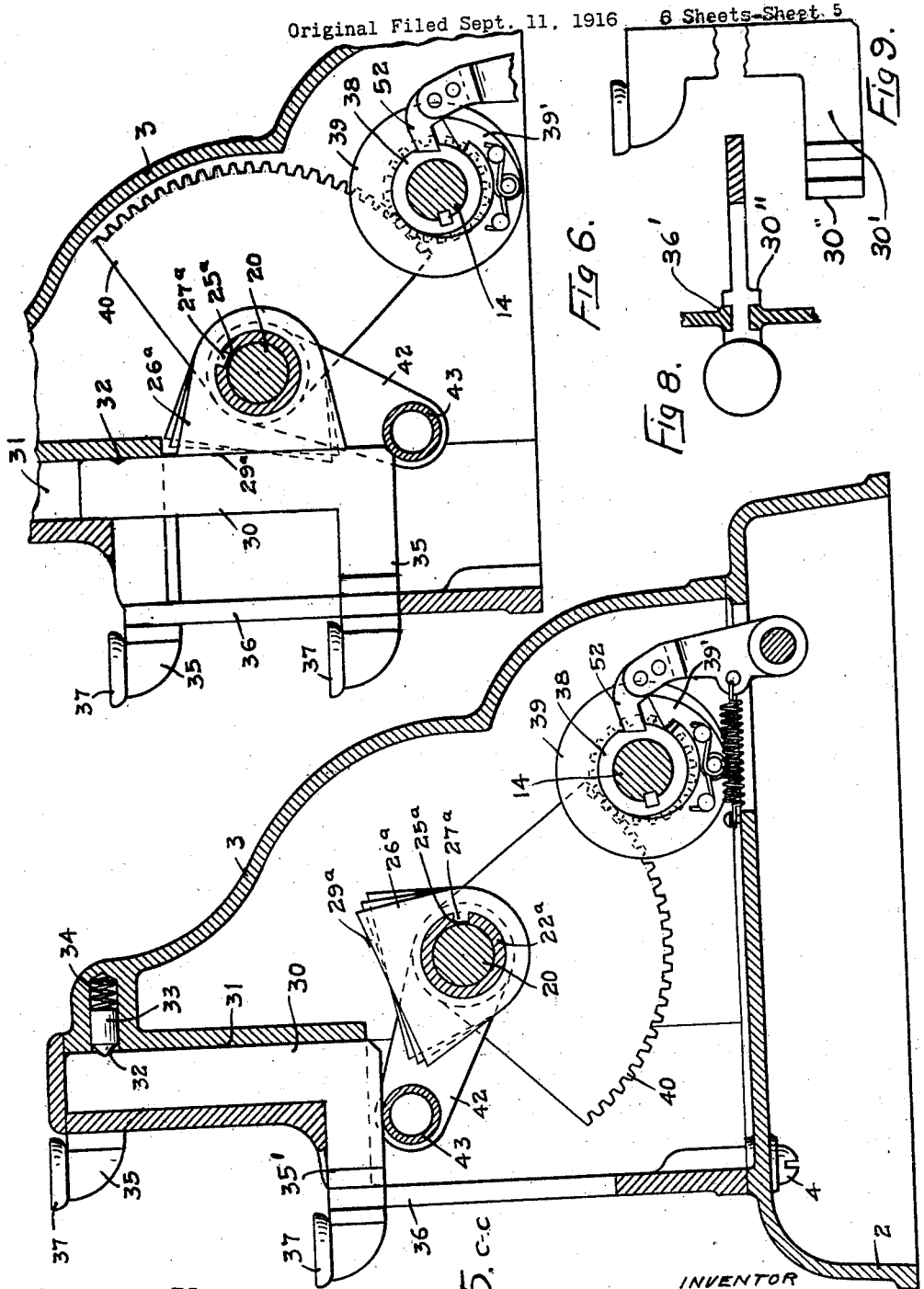

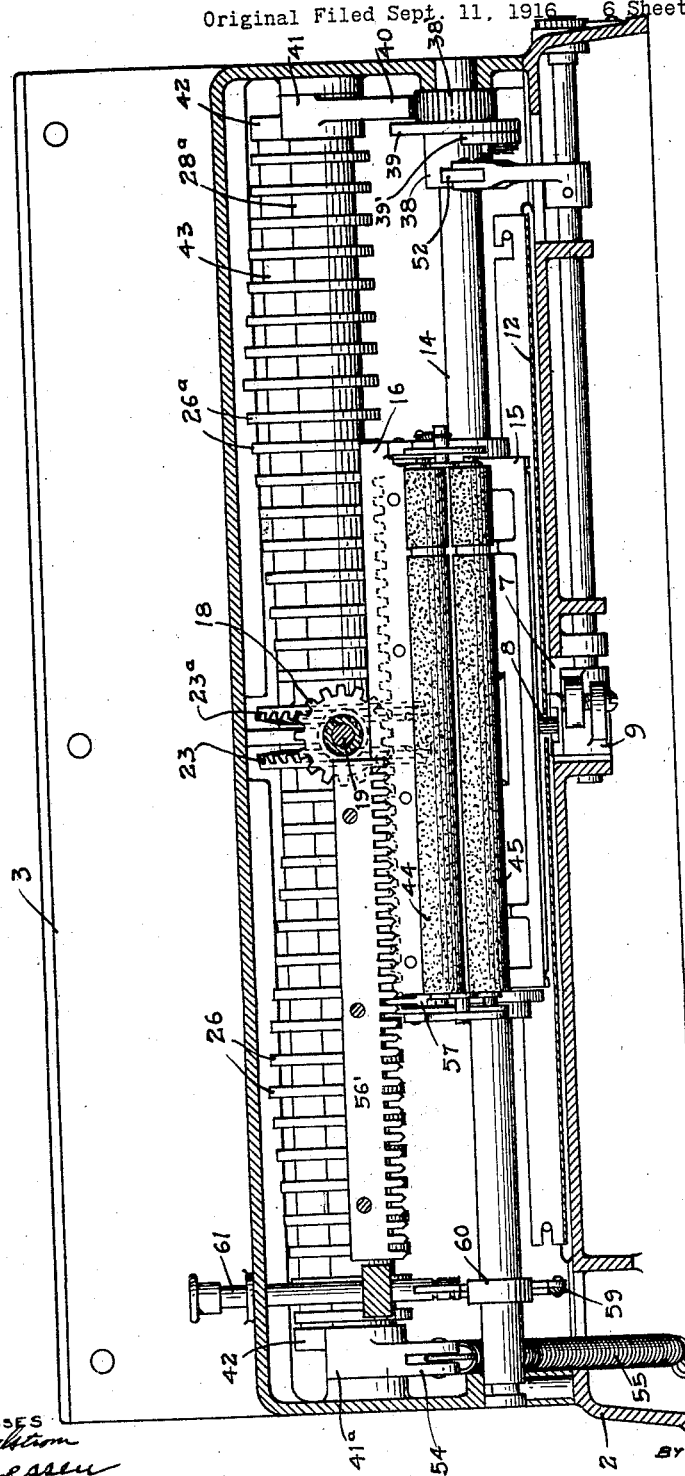

1,488,731

UNITED STATES PATENT OFFICE.

GAYLORD W. BEEBE, OF ALBANY, GEORGIA.

CHECK PROTECTOR.

Application filed September 11, 1916, Serial No. 119,591. Renewed June 27, 1923. Serial No. 565,129.

*To all whom it may concern:*

Be it known that I, GAYLORD W. BEEBE, a citizen of the United States, resident of Albany, in the county of Dougherty, State of Georgia, have invented certain new and useful Improvements in Check Protectors, of which the following is a specification.

In check protectors of the general type illustrated herein it is customary to move the carriage connected with the printing or marking wheel back and forth on a scale bearing figures or characters corresponding to those of the printing wheel so that, while the printing wheel is invisible, the operator of the machine by glancing at the scale can properly locate the character or word to be printed on the paper, and thereafter by operating another part print on the paper. This method of operating is comparatively slow and the primary object of my invention is to provide means by which the carriage may be adjusted easily and quickly through the operation of any one of a series of keys grouped in the form of a key-board at one side of the machine, and by the same operation of the key mark or print the desired word or character on the paper.

A further object is to provide an attachment which can be applied to a certain well known type of check protector without altering the arrangement and operation of the inking and printing mechanism.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a well-known type of check protector with my invention applied thereto, Figure 2 is a transverse sectional view on the line A—A of Figure 1, Figure 3 is a transverse sectional view on the line B—B of Figure 1, Figure 4 is a plan sectional view, showing the mechanism for operating the printing wheel carriage, Figure 5 is a transverse sectional view on the line C—C of Figure 1, Figure 6 is a view of a portion of the machine illustrated in Figure 5, showing a key in its depressed position, Figure 7 is a vertical sectional view on the line D—D of Figure 2, Figures 8 and 9 are detail views of the keys.

In the drawing, 2 represents the base of the machine, having a top or superstructure 3 secured to the base by suitable means, such as screws 4. The lower edges of this top on each side are provided with recesses 5 for the insertion of the check, draft or other instrument to be marked into the machine. A shelf 6 is removably supported on the outside of the machine upon which the paper is placed for insertion endwise into the recess. This shelf forms the part of a well-known machine in general use and I make no claim to the same herein nor need its details be described.

A recess 7 is provided in the base, through which a corrugated serrating wheel 8 operates and is supported in an oscillating bracket 9 arranged beneath the base and also forming a part of the check protector above referred to. A roller 10 is mounted in the opening 7 and a spring device 11 is carried by the top and has one end contacting with the surface of the roller and gripping the paper inserted between them. A guard plate 12 is mounted in the top between the recesses 5—5 and has an opening 13 to register substantially with the opening 7 in the base. I make no claim to these features, as they correspond substantially to the check protector above described.

14 is a revolving shaft mounted in bearings lengthwise of the machine and 15 is a printing wheel splined on said shaft to slide lengthwise thereof and revolve therewith. 16 is a carriage, loosely mounted on the shaft 14 and free to slide thereon for moving the wheel back and forth on the shaft to adjust the word or character thereon in its proper position to mark or print the paper as the wheel is revolved.

The carriage is provided with a rack bar 17 meshing with the teeth of a gear 18 that is secured on a short shaft 19 having bearings 21 and 21' in the cover or top 3. A shaft 20 has bearings in the end walls of the top 3 and is parallel with the shaft 14 and above the level of the same. A sleeve 22 is mounted to rotate on the shaft 20 and is provided at its inner end with a beveled gear 23 which meshes with a pinion 24 secured on the shaft 19. On the opposite side of the bearing 21 from the gear 23 I provide a duplicate arrangement of sleeve and gear which I will designate by the same reference numeral with the addition of the exponent "a." The sleeve 22 is provided with a longitudinal slot 25 and a series of cam plates 26 are mounted on said sleeve and have lugs 27 fitting within said slot for rotating the sleeve when any one of the plates is operated by depressing a key. These plates are held securely in parallel relation with one another by spacing collars 28 and each plate has a flat surface 29 formed on the edge thereof, said surfaces being out of alignment with one another, as indicated in Figure 5, and in the path of a corresponding number of keys 30 and 30' mounted to slide in guides 31 in the top of the machine and having depressions 32 therein to receive pins 33 yieldingly held in said depressions by springs 34. The keys have outwardly projecting arms 35 and 35', vertically slidable in slots 36 in the wall of the top (the upper slots for arms 35 not being shown, but corresponding to those described) and provided with buttons 37 having marks or characters thereon corresponding to those on the printing wheel so that the operator, glancing at the key-board, will have a duplication of the characters on the printing wheel before him and can select any key bearing a character or figure which he wishes to be reproduced on the paper and by the depression of the key adjust the carriage and printing wheel in position to contact with the paper and print said character or figure on the paper.

The sleeve 22a is equipped with plates having surfaces in the path of the keys corresponding to those described and which I will designate by the same reference numeral, with the addition of the exponent "a." The keyboard as indicated in Figure 1, is composed of keys arranged in groups on opposite sides of the transverse axis of the machine and any one key on either side may be depressed to operate the locating and printing mechanism.

When a key at one side of the transverse axis is operated and the sleeve at that end of the shaft rotated in one direction, the corresponding sleeve on the other end of the shaft will also be rotated but in the opposite direction, and, as indicated in Figure 5, there is sufficient clearance between the contacting surfaces of the plates and the keys to allow one set of plates to be swung upwardly when the other set of plates is moved in the opposite direction by the depression of the key.

The shaft 14 is provided with a notched hub 38 and a gear 38' is loosely mounted on said shaft and carries a disc 39 having a dog 39' to engage the hub 38 and rotate the shaft 14. A gear segment 40 is formed on a hub 41 secured to one end of the shaft 20 and meshes with the gear 38' that is fast to the disc 39. A similar hub 41a is mounted on the opposite end of said shaft and said hubs are provided with arms 42 carrying a rod 43 between them which extends parallel with the shaft 20 and beneath and in the path of the keys 30 and 30'. Upon the downward movement of a key the rod 43 will be depressed to rock the hub 41 and impart a rotating movement through the segment 40 to the shaft 14 and revolve the printing wheel, and during the latter part of the rotation engage the selected word or character with the paper and print same thereon. The downward movement of a key will also engage it with the edge 29 of the cam plate 26 beneath and rotate the sleeve 22 and the gear connected therewith and set the carriage and printing wheel in proper position to print the characters or figure selected and at the same time lock said carriage and printing wheel in the printing position.

The cam plates 26 are so positioned that their travel increases from the inner central plates toward the outer ones. This is to compensate for the difference in travel of the carriage, its normal position being, as shown in Figure 7, in the center of the machine, and obviously, to adjust the printing wheel for marking a character near one of the outer ends of the printing wheel, the carriage would travel a greater distance than for marking a character near the center of the printing wheel, and this difference in the movement of the carriage I compensate for by mounting the key-actuated plates so that their surfaces will be in staggered relation.

When operated by the keys, the cam plates will conclude their rotation at the same point, but their initial movement will vary according to the location of the actuating key. The carriage and printing wheel will move outward from the center in either direction, as a key on either side of the transverse axis is operated, thus reducing by one-half the movement otherwise required if the carriage began its initial movement from one end only. The keys, after locating the carriage on their downward stroke, hold the cam plates 26 in a locked position by means of the straight edge 29 bearing against the key stem 30, thus preventing further rotation of the gear wheels 23, 23a and pinion 24 and checking or locking the longitudinal movement or shifting of the carriage, while the rest of the stroke is completed for the printing of the paper. To hold the edge of the keys against lateral movement when pressed down, I prefer to provide additional guide-ways 36' adjacent to the slots 36 and guide lugs 30" engage these guide-ways during the movement of the keys.

Inking rollers 44 and 45 are mounted in the carriage in the path of the printing wheel.

The printing wheel during its revolution contacts with the inking rolls and is thoroughly inked and its movement continues until it contacts with the paper for impressing the desired mark or character, a well-known feeding means being provided for advancing the paper as the printing operation is performed. When the printing wheel has completed its revolution, the actuating key will be in the position shown in Figure 6 or at the limit of its downward movement and backward movement of shaft 14 is prevented by engagement of dog 52 with the notch 52' in the shaft 14. This locking dog is also a part of the mechanism of the machine above referred to and I make no claim to the same herein.

The hub 41$^a$ is provided with an arm 54 and an extension spring 55 connects this arm with the base of the machine, as shown in Figure 2, and normally holds the rod 43 in its raised position, and as soon as the operating key is released, this spring will rotate the shaft 20 backward and raise the rod 43 and through its contact with the lugs 56 on the gears 23 and 23$^a$ rotate either one of these gears which may have been previously operated to rock the sleeve connected therewith and return the key actuated cam plates to their normal, raised position. This upward movement of the rod 43 will also lift the key that has been depressed, returning it to its normal position in the key-board.

The numeral 56' designates a toothed bar with which a pivoted arm 57 supported by the carriage and actuated by suitable known means to be projected between the teeth of the bar to center the carriage and lock it during the printing operation. Such means are old and not claimed herein and therefore not illustrated in detail, and not being essential in this invention, as the locking of the carriage is effected by the engagement of the keys with the cam plates as already described, are indicated only in a conventional way.

For releasing the check or other instrument marked, a rocking rod 57' is provided with a finger 58 connected with the spring 11 as indicated in Fig. 3. A push rod 61 is connected with the rod 57' through suitable lever mechanism 59 so that when the push rod is depressed the rocking arm is turned to lift the finger 58 and spring 11 so as to release the check or instrument which has been printed. At other times the lever mechanism is actuated through a cam 60 (Fig. 2) on the shaft 14 so as to rock the rod 57' in a direction to release the spring 11 and permit it to hold the check or instrument being printed. This mechanism is not a part of the present invention and therefore not illustrated and described in all its details.

The operation of the machine is as follows: The check, draft or other instrument to be marked or printed, having been inserted into the machine, the operator will depress a key bearing the words or characters which he wishes printed or marked on the paper. The downward movement of the key, as indicated in Figure 5, will depress the rod 43 and rock the segment 40 to revolve the printing wheel and soon after the initial movement of the key it will contact with the surfaces 29 of one of the cam plates and rotate the sleeve whereon the plate is mounted to revolve the gears and adjust and lock the carriage and printing wheel in the proper position to print the word or character on the paper corresponding with the word or character on the key which has been operated. The shaft 14 is continuously rotated during the depression of a key by means of the segment 40, pinion 38', disc 39, pawl 39' and a ratchet tooth 38$^2$ shown on hub 38 in Fig. 5 and Fig. 6 in a position to be engaged by the pawl 39'. The shaft 14 and printing wheel 15 turn continuously and complete one revolution during the entire downward stroke of the key, the first effect of which is to force the dog 52 outwards from the notch 52' in the hub in which it is normally resting and thereby raise the platen 8 into operative position in the path of the printing wheel 15. As the printing wheel rotates, its type engages the inking rollers 44 and 45 at about the time the carriage has been moved to the proper longitudinal position for printing the word or character designated on the operated key and, the check being in printing position on the platen 8, a continued rotation of the printing wheel will engage the inked type of the wheel with the check or paper over the circular platen 8, impress the paper, print the character of the types on it and at the same time advance the check over the platen. The short final movement of the printing wheel to complete the revolution after printing the check serves to let the dog 52 drop back into the notch in the hub 38, lowering the platen 8 to the original position and when the key is released and returned by the action of the spring 55 the pawl moves back over the ratchet tooth on the hub 38 while the shaft 14 and printing wheel 15 are held against movement by the dog 52 and notch 52'. At the same time the spring 55 will return the sleeves, cam plates and carriage to the original position ready to repeat the operation when another key is depressed.

I claim as my invention:

1. A check protector comprising a printing wheel movable longitudinally and circularly about an axis, a set of operating keys, mechanism connecting the keys with the printing wheel for moving said wheel longitudinally and circularly on actuation of the keys, and means co-acting with the keys to check the longitudinal movement of the printing wheel while permitting movement about its axis.

2. A check protector comprising a printing wheel movable longitudinally and circularly about an axis, a set of operating keys, mechanism connecting the keys with the printing wheel for moving said wheel longitudinally and circularly on actuation of the keys, means co-acting with the keys to check the longitudinal movement of the printing wheel while permitting movement about its axis, and means for automatically releasing the printing wheel and returning it and the operating key to normal position upon release of the key.

3. A check protector comprising a printing wheel movable longitudinally and circularly about an axis, a set of operating keys, mechanism connecting the keys with the printing wheel for moving said wheel longitudinally and circularly on actuation of the keys, means co-acting with the keys to check the longitudinal movement of the printing wheel while permitting movement about its axis, means for automatically releasing the printing wheel and returning it and the operating key to normal position upon release of the key, and means for locking the operating keys in normal position.

4. A check protector comprising a printing wheel movable longitudinally and circularly about an axis, separate groups of keys, mechanism connecting each group of keys with the printing wheel, the mechanism connecting one group being adapted to move the printing wheel in one direction longitudinally of its axis and that connecting the other group to move it in the opposite direction, and means co-acting with the keys to check the longitudinal movement of the printing wheel while permitting movement about its axis.

5. A check protector comprising a printing wheel movable longitudinally and circularly about an axis, said wheel being normally midway between the ends of its longitudinal supporting axis, separate groups of keys, mechanism connecting each group of keys with the printing wheel, the mechanism connecting one group being adapted to move the printing wheel in one direction longitudinally of its axis and that connecting the other group to move it in the opposite direction, means co-acting with the keys to check the longitudinal movement of the printing wheel while permitting movement about its axis, and means for automatically restoring the printing wheel to normal position.

6. A check protector comprising a support for a check, draft or other instrument to be marked, a printing wheel having a longitudinal movement to position the word or character thereon to be printed with respect to the paper and a rotary movement for impressing the word or character on the paper, a series of keys and mechanism actuated by the movement of the keys for locating the printing wheel in position to impress the paper and revolving it to engage the paper.

7. A check protector comprising a support for a check, draft or other instrument, a printing wheel having words, figures or characters thereon, a shaft, a series of plates having cam surfaces, a series of keys positioned to engage said cam surfaces and rock said plates, and mechanism actuated by the movement of said keys and plates for positioning the word or character to be printed, to its proper printing position with respect to the paper and operating the printing wheel to impress its words, marks or characters in the paper.

8. A check protector comprising a support for a check, draft or other instrument, a printing wheel, a carriage therefor, a pinion geared to said carriage for positioning it and said printing wheel with respect to the work for printing the desired word or character on the paper, gears mounted upon opposite sides of said pinion and meshing therewith, a series of keys arranged in groups upon opposite sides of said gears and having driving connections therewith for operating them independently of one another to position said carriage and printing wheel, and means actuated through the movement of a key of either group for revolving said printing wheel to impress the paper.

9. A check protector comprising a support for a check, draft or other instrument, a revolving shaft, a carriage mounted to slide thereon, a printing wheel splined on said shaft and slidable with said carriage and having a revolving movement with said shaft independently of said carriage, a second shaft, a toothed quadrant thereon geared to said first named shaft for revolving it and said printing wheel, a plurality of keys, mechanism actuated by the initial movement of a key for positioning said carriage and printing wheel with respect to the work for printing the desired word or character on the paper, and during the movement of a key revolving said carriage shaft to move the desired characters on said printing wheel into contact with the paper to be marked.

10. A check protector comprising a support for a check or other instrument to be marked, a printing wheel, a series of keys having marks or characters corresponding to those of the printing wheel, mechanism actuated by the movement of a key for positioning said printing wheel with respect to the work and then moving it for contacting it with the work, and means for returning said printing wheel and keys to their normal position when the keys are released.

11. A check protector comprising a support for a check, draft or other instrument, a printing wheel, a pinion and means meshing therewith for positioning said printing wheel with respect to the work, a gear having a driving connection with said pinion and provided with a projecting lug, a series of keys having characters corresponding to those on said printing wheel, means actuated by any key of the series for rotating said pinion to position said printing wheel with respect to the work, the final downward movement of the key revolving said printing wheel to impress a word or character on the paper and means engaging the lug on said gear for returning it, said pinion and said printing wheel and key to their normal position when the key is released.

12. A check protector comprising a support for a check, draft or other instrument, a printing wheel, a series of keys arranged in two groups upon opposite sides of the middle portion of the check protector, said printing wheel having a movement longitudinally of its support and positioned near the center thereof for the printing operation, mechanism actuated by the depression of a key of either group for first moving said printing wheel to position the word, mark or character thereon with respect to the point where the desired character is to be printed on the paper to be marked, and revolving said printing wheel to make the impression or mark on the paper, and means for returning all the parts to their normal position when said key is released.

13. A check protector comprising a slidable and rotatable printing wheel, a key operatively connected with the printing wheel to slide and rotate the wheel, and means operable from the key for temporarily locking the printing wheel against slidable movement while being rotated to operative printing position by further movement of the key.

14. A check protector comprising a slidable and rotatable printing wheel, a series of independently operable keys, each operatively connected with the printing wheel, and means operatively connected with the series of keys and operable from any selected key of the series for temporarily locking the printing wheel against slidable movement while being rotated to operative printing position by further movement of the key, the means connecting the keys with the printing wheel permitting a greater slidable movement of the printing wheel for some keys than for others before locking the printing wheel against slidable movement.

15. A check protector comprising a support for an element to be printed, a printing wheel adapted to slide and rotate, means for sliding and rotating the wheel, and means for locking the wheel against slidable movement while being rotated to operative printing position.

16. A check protector comprising a support for an element to be printed, a printing wheel adapted to slide and rotate, means arranged in groups and selectively operative for sliding the printing wheel in a desired direction, means for holding said wheel at the point to which moved, and means for rotating the wheel in its printing position.

In witness whereof, I have hereunto set my hand this 6th day of September, 1916.

GAYLORD W. BEEBE.